(12) United States Patent
Katz et al.

(10) Patent No.: US 10,290,154 B1
(45) Date of Patent: *May 14, 2019

(54) STEREO-BASED CALIBRATION APPARATUS

(71) Applicant: Facebook Technologies, LLC, Menlo Park, CA (US)

(72) Inventors: Dov Katz, Las Vegas, NV (US); Jennifer Leigh Dolson, Menlo Park, CA (US); Simon Hallam, San Jose, CA (US); Kieran Tobias Levin, Redwood City, CA (US); Eric Loren Vaughan, Half Moon Bay, CA (US); Klas Petter Ivmark, Belmont, CA (US); Andrew Melim, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,527

(22) Filed: Sep. 12, 2018

Related U.S. Application Data

(63) Continuation of application No. 15/721,603, filed on Sep. 29, 2017, now Pat. No. 10,127,732, which is a (Continued)

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G06K 9/6201* (2013.01);
(Continued)

(58) Field of Classification Search
None
See application file for complete search history.

(56) References Cited

U.S. PATENT DOCUMENTS

| 9,589,348 B1 | 3/2017 | Linde et al. |
| 9,619,021 B2 | 4/2017 | Cho et al. |
| (Continued) | | |

OTHER PUBLICATIONS

United States Office Action, U.S. Appl. No. 15/721,603, dated Apr. 19, 2018, 8 pages.

*Primary Examiner* — Peter Hoang
(74) *Attorney, Agent, or Firm* — Fenwick & West LLP

(57) ABSTRACT

A virtual reality (VR) headset calibration system calibrates a VR headset, which includes a plurality of locators and an inertial measurement unit (IMU) generating output signals indicative of motion of the VR headset. The system comprises a calibration controller configured to receive a headset model of the VR headset that identifies expected positions of each of the locators. The controller controls cameras to capture images of the VR headset while the headset is moved along a predetermined path. The images detect actual positions of the locators during the movement along the predetermined path. Calibration parameters for the locators are generated based on differences between the actual positions and the expected positions. Calibration parameters for the IMU are generated based on the calibration parameters for the locators and differences between expected and actual signals output by the IMU. The calibration parameters are stored to the VR headset.

20 Claims, 8 Drawing Sheets

Related U.S. Application Data continuation of application No. 14/941,334, filed on Nov. 13, 2015, now Pat. No. 9,805,512.

(51) Int. Cl.
  *H04N 5/247*  (2006.01)
  *G06T 7/571*  (2017.01)
  *G06K 9/62*  (2006.01)
  *G02B 27/01*  (2006.01)
  *G06T 7/55*  (2017.01)

(52) U.S. Cl.
  CPC ............... *G06T 7/55* (2017.01); *G06T 7/571* (2017.01); *H04N 5/247* (2013.01); *G02B 2027/0178* (2013.01)

(56) References Cited

U.S. PATENT DOCUMENTS

| | | |
|---|---|---|
| 2012/0242560 A1 | 9/2012 | Nakada et al. |
| 2013/0128364 A1 | 5/2013 | Wheeler et al. |
| 2014/0361977 A1 | 12/2014 | Stafford et al. |
| 2017/0147066 A1 | 5/2017 | Katz et al. |

STEREO-BASED CALIBRATION APPARATUS

CROSS REFERENCE TO RELATED APPLICATIONS

This application is a continuation of U.S. application Ser. No. 15/721,603, filed Sep. 29, 2017, which is a continuation of U.S. application Ser. No. 14/941,334, filed Nov. 13, 2015, now U.S. Pat. No. 9,805,512 which is incorporated by reference in its entirety.

BACKGROUND

The present disclosure generally relates to calibration systems, and more specifically relates to calibrating virtual reality systems.

Virtual reality (VR) devices deliver media to users based at least in part on the position and movement of a headset worn by a user. These devices include components used to determine the position and movement of the headset. However, due to manufacturing tolerances and other variations introduced during manufacturing or use of the VR headsets, these components may differ from an ideal model of the headset. Thus, cameras and other equipment that assess the location of these components may not produce an output identical to the output expected from the headset model. As a result of the differences between the actual and expected outputs, the virtual reality device may not be able to accurately track the position or motion of the headset. For example, the differences may cause the device to identify motion of the headset when there is none or to calculate incorrect rates of the motion. These inaccurate measurements may cause a dissonance between a user's actual motion and media presented to the user via the headset.

SUMMARY

A headset calibration system calibrates components of a virtual reality (VR) headset to compensate for differences between headsets (e.g., due to manufacturing tolerances), enabling a VR system associated with the VR headset to maintain tracking of the VR headset. In one embodiment, the components calibrated by the calibration system include locators on the VR headset and an inertial measurement unit (IMU). A locator is an object located in a specific position on the VR headset relative to one or more other components, such as another locator, of the VR headset and relative to a reference point on the VR headset. The IMU is a device that generates output signals indicative of motion of the VR headset, and may include various sensors to generate such signals, such as accelerometers, gyroscopes, and other inertial measurement systems.

In one embodiment, the headset calibration system includes a plurality of cameras, an imaging space imaged by the cameras, and a support arm configured to couple to a VR headset and move the VR headset in predetermined manners. For example, the support arm moves the VR headset along a predetermined path through the imaging space to calibrate the locators, and moves the VR headset in one or more other predetermined manners to calibrate the IMU. The system also includes a calibration controller configured to calibrate the VR headset by determining differences between expected and actual positions of the locators on the VR headset and differences between expected and actual outputs of the IMU.

The calibration controller accesses a memory that stores a set of expected positions of the locators on the headset. The calibration controller controls the cameras to capture images of the VR headset while the headset is moved along the predetermined path. The captured images detect actual positions of the locators on the VR headset, which may differ from the expected positions due to manufacturing tolerances. Using images captured at each position of the VR headset, the calibration controller identifies the respective position of the VR headset in the imaging space and determines positions of at least a subset of the locators in the imaging space. The calibration controller uses the determined position of each locator in the subset in the imaging space and the identified position of the VR headset to compute a difference between an actual position of each locator in the subset on the VR headset and an expected position of the locator. Based on the computed differences, the calibration controller generates calibration parameters for the locators. In one embodiment, the parameters for the locators represent transformations that when applied to positions of the locators in the imaging space to yield the expected positions of the locators on the VR headset.

The calibration controller also generates calibration parameters for the IMU based on the calibration parameters for the locators and differences between expected signals output by the IMU and actual signals output by the IMU. In one embodiment, the headset calibration system performs both a static calibration (e.g., measuring signals output by the IMU while the headset is held at a specified position) and a dynamic calibration (e.g., measuring signals output by the IMU while the headset is moved). The calibration parameters for the IMU may represent transformations that when applied to actual signals output by the IMU yield the expected signals.

The calibration controller stores the calibration parameters for the locators and the IMU to the headset. The calibration parameters can then be used during operation of the headset to accurately identify positions and motion of the headset.

DETAILED DESCRIPTION

Virtual Reality System Architecture

Figure 1:
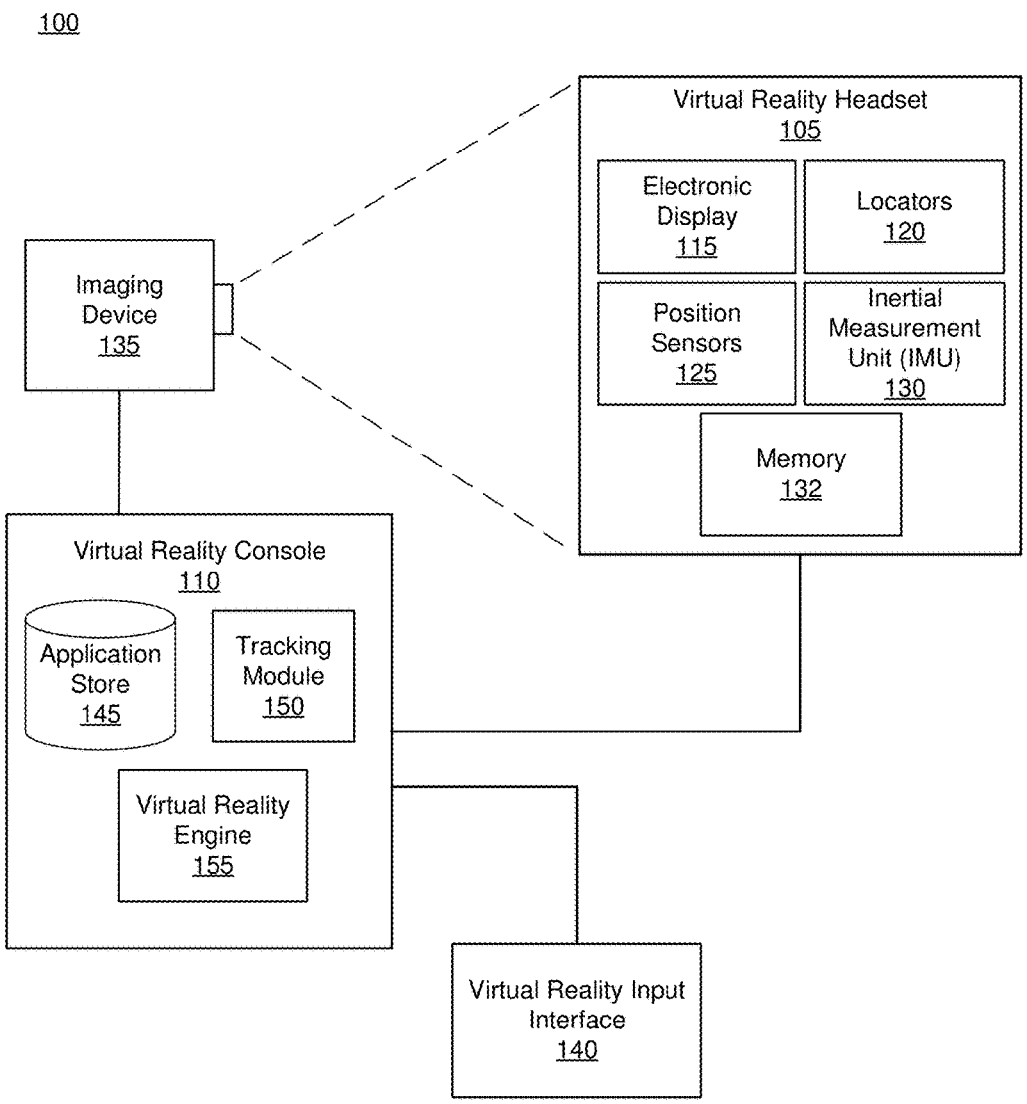
FIG. 1 is a block diagram of a system environment in which a virtual reality console operates, in accordance with an embodiment.

FIG. 1 is a block diagram of one embodiment of a virtual reality (VR) system environment 100 in which a VR headset 105 operates. The system environment 100 shown by FIG. 1 comprises the VR headset 105, an imaging device 135, and a VR input interface 140 that are each coupled to a VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

As further described below, the virtual reality console 110 receives movement information from the VR headset describing movement of the VR headset 105 as determined by sensors on the VR headset 105. In addition, the virtual reality console 110 receives image information from the imaging device 135 showing the VR headset 105 as captured by the imaging device 135. The position of the virtual reality headset 105 in space is determined using the movement information and the image information. Before using the movement information, the movement information may be translated from observed movement information using calibration data for the sensors that captured the data, in order to correct for manufacturing and other differences between different VR headsets. In addition, the image information is used to detect the position of locators on the VR headset 105. Each of the locators may also differ from headset to headset, and a set of calibration parameters are used to convert the identified positions of the locators from the imaging device to account for the particular difference of the locators on the VR headset 105 observed by the imaging device 135 relative to a model of the VR headset 105. Using these calibration parameters, the virtual reality console 110 may correct for differences between different VR headsets and more accurately model the movement of the VR headset in a virtual reality system.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. Example embodiments of the VR headset 105 are further described below in conjunction with FIGS. 2A and 2B.

In various embodiments, the VR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. An embodiment of the VR headset 105 that includes two rigid bodies that are non-rigidly coupled together is further described below in conjunction with FIG. 2B.

The VR headset 105 includes an electronic display 115, one or more locators 120, one or more sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). In some embodiments, the media provided to the electronic display 115 for presentation to the user is pre-distorted to aid in correction of one or more types of optical errors. Additionally, the optical components may increase a field of view of the displayed media through magnification or through another suitable method. For example, the field of view of the displayed media is such that the displayed media is presented using almost all (e.g., 110 degrees diagonal), and in some cases all, of the user's field of view.

The locators 120 are objects located in specific positions on the VR headset 105 relative to one another and relative to a specific reference point on the VR headset 105. Each locator 120 provides a point on the VR headset 105 that may be identified by an external camera, such as the imaging device 135, to determine the orientation and motion of the VR headset. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band. Thus, the locators 120 may emit light in the IR band under an outer surface that is transparent in the IR band but opaque in the visible band.

A model of the VR headset 105 (such as a CAD model used to manufacture the headset) specifies the positions of the locators 120 on the headset 105. Since each headset 105 ideally has locators 120 distributed in the same pattern, the positions of at least a subset of the locators 120 can be used during operation of the VR headset 105 to determine a position of the headset in space. However, the actual positions of the locators on the VR headset 105 may deviate from the model positions due to manufacturing tolerances. For this and other reasons, the actual locator positions may vary between different headsets 105.

The IMU 130 is an electronic device that generates motion data based on measurement signals received from one or more of the sensors 125. The motion data includes, for example, translational or rotational velocity and translational or rotational acceleration of the VR headset 105. To generate the motion data, a sensor 125 generates one or more measurement signals in response to motion of the VR headset 105, and may measure the absolute position or inertial movement of the sensor. Examples of the sensors 125 include: one or more accelerometers, one or more gyroscopes, one or more magnetometers, or any other suitable type of sensor, or some combination thereof. The sensors 125 may be located external to the IMU 130, internal to the IMU 130, or some combination thereof.

Based on the one or more measurement signals from one or more sensors 125, the IMU 130 generates motion data indicating an estimated position of the VR headset 105 relative to an initial position of the VR headset 105. For example, the sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point (e.g., intermediate estimated position) on the VR headset 105. Alternatively, the IMU 130 provides the sampled measurement signals to the VR console 110, which determines the motion data. The reference point is a point that may be used to describe the position of the VR headset 105. The reference point may generally be defined as a point in space; however, in practice, the reference point is defined as a point within the VR headset 105 (e.g., a center of the IMU 130).

Like the locators 120, the IMU 130 may vary between VR headsets 105 due to manufacturing tolerances. For example, different sensors 125 may output slightly different signals under the same conditions or the IMU 130 may be offset by small amounts from the headset model.

In one embodiment, the IMU 130 receives one or more calibration parameters from the memory 132 that compensate for differences between headsets 105. As further discussed below, the calibration parameters are uniquely generated for each VR headset 105 and map the headset 105 to an ideal headset model, reducing error in determining positions and rates of movement of the headset 105. Based on a received calibration parameter (e.g., IMU parameters), the IMU 130 may adjust its operation (e.g., change sample rate, etc.). In some embodiments, as further described below, certain calibration parameters cause the IMU 130 to offset an estimated position of the VR headset 105 to correct positional errors resulting from deviations of the headset 105 from the headset model.

The imaging device 135 generates position data in accordance with calibration parameters received from the VR console 110. Position calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ration). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which reflect the light towards the light source in the imaging device 135. Position calibration data is communicated from the imaging device 135 to the VR console 110.

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions that, when executed by a processor, generates media for presentation to the user. Media generated by an application may be in response to inputs received from the user via movement of the HR headset 105 or the VR interface device 140. Examples of applications include: gaming applications, conferencing applications, video playback application, or other suitable applications.

The tracking module 150 tracks movements of the VR headset 105 using position data from the imaging device 135 and/or motion data received from the IMU 130. In one embodiment, the tracking module 150 determines positions of a reference point of the VR headset 105 using observed locators from the position data, a model of the VR headset 105, and calibration parameters of the locators. For example, the tracking module 150 observes positions of the locators in the position data. The observed locators are identified, and calibration parameters for the observed locators are retrieved from the memory 132 of the headset 105. The tracking module 150 applies the calibration parameters to the observed positions to transform the observed positions to expected positions of the corresponding locators on the VR headset. The expected positions are then applied to the model of the VR headset 105 to determine the position of the reference point.

In one embodiment, the tracking module 150 also determines positions of a reference point of the VR headset 105 using the motion data. Additionally, in some embodiments, the tracking module 150 may use portions of the motion data, the position data, or some combination thereof, to predict a future location of the headset 105. The tracking module 150 provides the estimated or predicted future position of the VR headset 105 to the VR engine 155.

The VR engine 155 executes applications within the system environment and receives position information, acceleration information, velocity information, predicted future positions, or some combination thereof, of the VR headset 105 from the tracking module 150. Based on the received information, the VR engine 155 determines media to provide to the VR headset 105 for presentation to the user. For example, if the received information indicates that the user has looked to the left, the VR engine 155 generates media for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
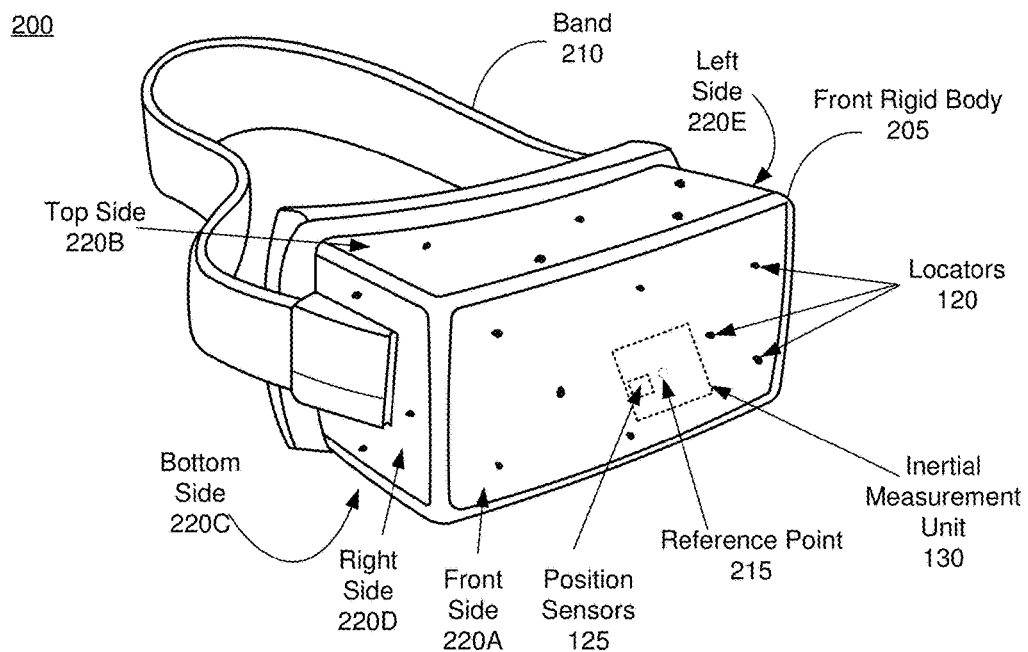
FIG. 2A is a wire diagram of a virtual reality headset, in accordance with an embodiment.

FIG. 2A is a wire diagram of one embodiment of a virtual reality headset. The VR headset 200 is an embodiment of the VR headset 105 and includes a front rigid body 205 and a band 210. The front rigid body 205 includes the electronic display 115 (not shown), the IMU 130, the one or more sensors 125, and the locators 120. In the embodiment shown by FIG. 2A, the sensors 125 are located within the IMU 130, and neither the sensors 125 nor the IMU 130 are visible to the user.

The locators 120 are located in fixed positions on the front rigid body 205 relative to one another and relative to a reference point 215. The reference to locators 120 in FIG. 2A includes some of the locators 120 present on the headset, though additional locators 120 are present in this example. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
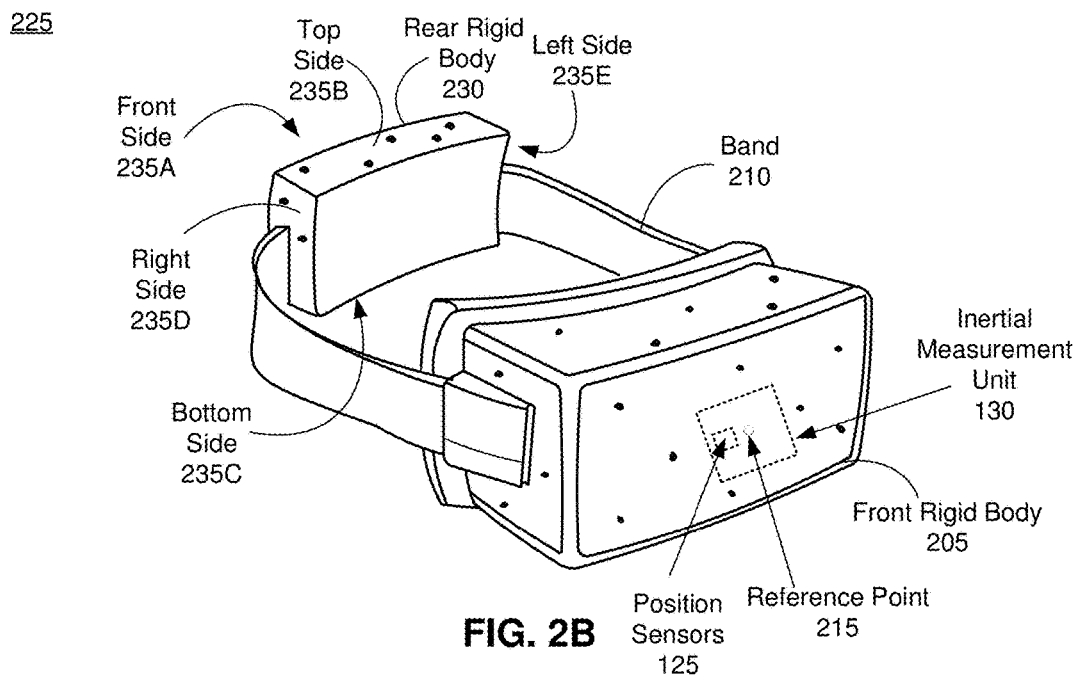
FIG. 2B is a wire diagram of a virtual reality headset including a front rigid body and a rear rigid body, in accordance with an embodiment.

FIG. 2B is a wire diagram of an embodiment of a VR headset 225 including a front rigid body 205 and a rear rigid body 230. The VR headset 225 shown in FIG. 2B, is an embodiment of the VR headset 105 where the front rigid body 205 and the rear rigid body 230 are coupled together via the band 210. The band 210 is non-rigid (e.g., elastic), so the front rigid body 205 is not rigidly coupled to the rear rigid body 210. Thus, the rear rigid body 230 may move in relation to the front rigid body 205, and, specifically, move in relation to the reference point 215. In some embodiments, the rear rigid body 230 allows the VR console 110 to maintain tracking of the VR headset 105, even if the front rigid body 205 is not visible to the imaging device 135. Locators 120 on the rear rigid body 230 are located in fixed positions relative to one another and relative to the reference point 215 on the front rigid body 205. In the example of FIG. 2B, one or more locators 120, or portions of locators 120, on the rear rigid body 230 are located on a front side 235A, a top side 235B, a bottom side 235C, a right side 235D, and a left side 235E of the rear rigid body 230.

Virtual Reality Headset Calibration System

Figure 3A:
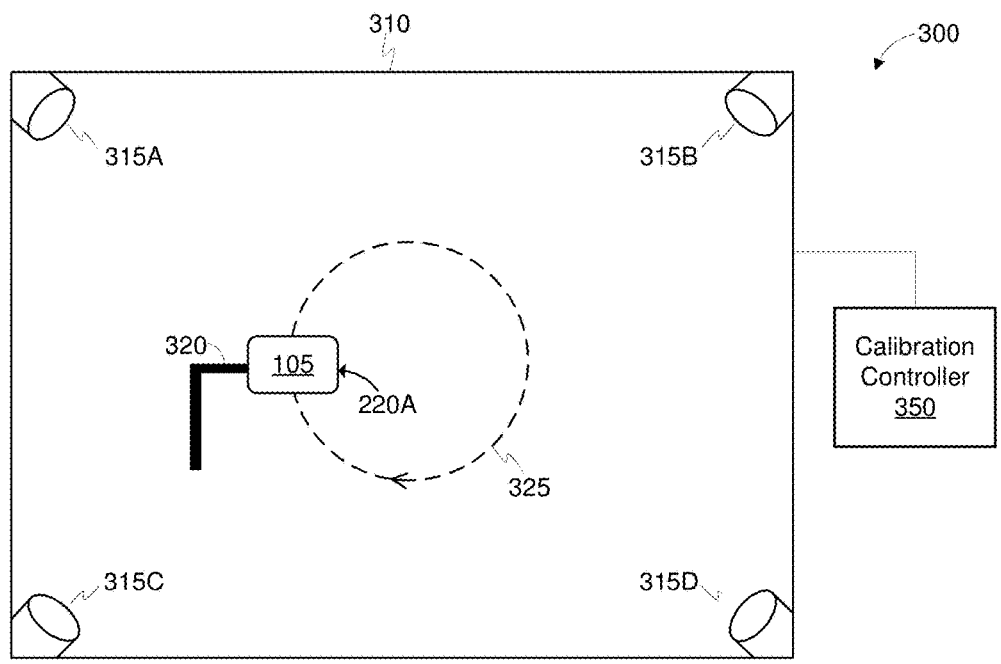
FIG. 3A is a schematic diagram of a headset calibration system, in accordance with an embodiment.

FIG. 3A is a schematic diagram illustrating a headset calibration system 300, according to one embodiment. In one embodiment, as shown in FIG. 3A, the headset calibration system 300 includes an imaging space 310 and a calibration controller 350 controlling operation of the headset calibration system 300. The imaging space 310 includes a plurality of cameras 315 and a support arm 320 supporting a VR headset 105. The support arm 320 and/or the cameras 315 move in predetermined manners while the cameras 315 image the VR headset 105. Based on the images captured by the cameras 315, the headset calibration system 300 generates calibration parameters for the VR headset 105 that are used during operation of the VR headset 105 to locate the headset in space and determine the headset's movement. These calibration parameters include parameters related to the positions of the locators, which compensate for differences between expected (or model) positions and actual positions of the locators 120 of a headset 105. The calibration parameters also include parameters related to static and dynamic outputs of the IMU 130. For the static outputs, the calibration parameters represent differences between expected and actual signals output from the IMU 130 while the headset 105 is static. For the dynamic outputs, the calibration parameters represent differences between expected and actual signals output from the IMU 130 while the headset 105 is rotated or otherwise moved.

The support arm 320 is configured to attach to or otherwise support a VR headset 105 within the imaging space 310. In one embodiment, the support arm 320 includes clamps, screws, clips, or other fasteners to attach the VR headset 105 to the support arm 320. For example, a clamp connected to the support arm 320 clamps to the top side 220B and bottom side 220C of a VR headset 105, or clamps to a right side 220D and a left side 220E of the VR headset 105. In the example of FIG. 3A, the support arm 320 is attached to a back face of the headset 105, opposite the front face 220A. Alternatively, a top of the support arm 320 may have a cavity shaped to receive a VR headset 105 to support the headset, without the support arm 320 fastening to the headset. Furthermore, for embodiments of the headset 105 having both a front rigid body 205 and a rear rigid body 230, the support arm 320 may support the front rigid body 205 while a second support arm (not shown) supports the rear rigid body 230. The second support arm fixes a position of the rear rigid body 230 with respect to the front rigid body 205, enabling the headset calibration system 300 to also calibrate the positions of the locators 120 on the rear rigid body 230.

The support structures of the support arm 320 may be configured to support the VR headset 105 without occluding the locators 120. For example, the support arm 320 clamps to a portion of the headset 105 that does not include locators 120, so that the clamps do not block imaging of the locators 120. The support arm 320 may also support a cable configured to electronically couple the VR headset 105 to the calibration system 300. Via the cable, the headset calibration system 300 receives information from the VR headset 105, such as signals output from the IMU 130, and sends information to the VR headset 105, such as the calibration parameters generated by the calibration system 300.

Figure 3B:
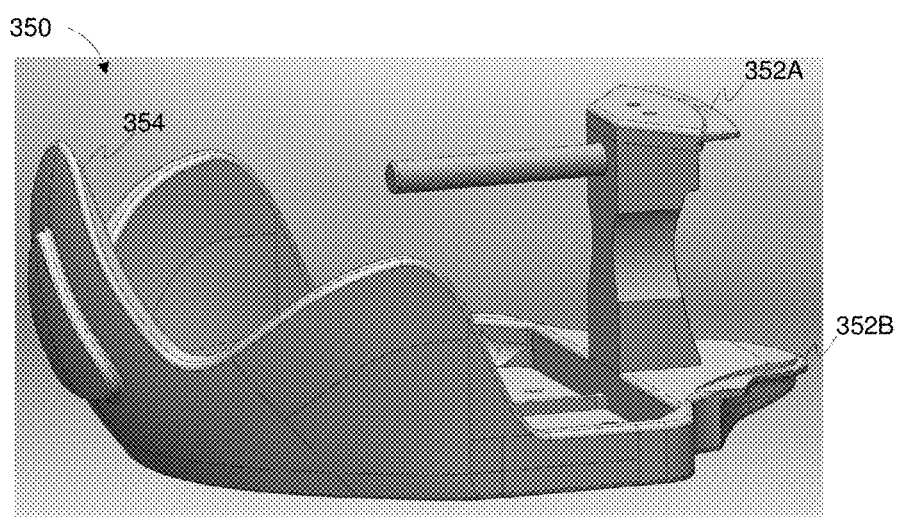
FIG. 3B illustrates an example headset support, in accordance with an embodiment.

An example headset support 350, which is coupled to the support arm 320 in the headset calibration system 300 to support the headset 105, is shown in FIG. 3B. In one embodiment, as illustrated in FIG. 3B, the headset support 350 includes front support structures 352A and 352B to support the front rigid body 205 of the headset 105. For example, a top of the front rigid body 205 rests on the support structure 352A, while a bottom of the front rigid body 205 rests on the support structure 352B. The band 210 of the headset 105 may be placed around a band support 354 to secure the headset 105 to the support 350. A clamp (not shown in FIG. 3B) may clamp to the inside of the front rigid body 205 to further secure the headset 105 to the support 350.

In one embodiment, the support arm 320 is coupled to actuators configured to move the support arm 320 and attached VR headset 105 in one or more predetermined manners within the headset calibration system 300. Moving the headset 105 in a predetermined manner enables the headset calibration system 300 to reliably compare actual positions of the locators 120 to expected locator positions and compare actual IMU 130 outputs to expected outputs. Given accurate comparisons between these values, the headset calibration system 300 can generate calibration parameters that improve the accuracy of the tracking module 150 when tracking a headset 105 in use. To calibrate positions of the locators 120 of a VR headset 105, the actuators move the support arm 320 along a fixed path 325. FIG. 3A illustrates one embodiment of the fixed path 325 being a circular path, but the actuators may move the support arm 320 along a path of any shape and oriented in any manner with respect to the cameras 315. For example, the path may move the headset 105 along a circular shape on a plane parallel to, perpendicular to, or at another angle to the imaging plane of the cameras 315, or along a path of any other shape. The path may move the headset 105 to provide the cameras a variety of perspectives and different views of the VR headset 105 and the locators 120. Thus, the path may rotate, turn, and otherwise move the VR headset 105 to different positions along the path. The actuators move the support arm 320 at a specified rate along the fixed path. To calibrate the IMU 130, the actuators rotate the headset 105 around one or more axes at a specified rate.

The cameras 315 capture images of the headset 105 while the headset is in the imaging space 310. The cameras 315 are configured such that the locators 120 are visible in the captured images, and therefore the cameras 315 may image in the visible, infrared, or ultraviolet spectra depending on the type of locators 120 used in the headset 105. FIG. 3A illustrates four cameras 315 positioned at corners and pointed toward a center of the imaging space 310. However, in other embodiments, the headset calibration system 300 may include additional or fewer cameras, and the cameras 315 may be located at different positions. For example, the cameras 315 and headset 105 may be approximately aligned on a common horizontal plane. Alternatively, the headset calibration system 300 may instead include cameras positioned above and below the headset 105 when the headset 105 is supported by the support arm 320. In one embodiment, the cameras 315 are positioned in the imaging space 310 to minimize imaging error for the path 325. For example, the cameras 315 are positioned such that any position along the path 325 is located within an overlap of fields of view of at least two of the cameras. Furthermore, in one embodiment, the cameras 315 are coupled to actuators to move the cameras 315 in a predetermined manner relative to the support arm 320. Based on the images captured by the cameras, the headset calibration system 300 determines actual positions of the locators 120 relative to expected positions and determines actual outputs from the IMU 130 relative to expected outputs.

The calibration controller 350, which is a computing device comprising a processor and a memory, controls the actuators of the support arm 320 and the cameras 315 to move the headset 105 in the predetermined manner and captured images of the headset. Using the images captured by the cameras 315, the calibration controller 350 generates calibration parameters and stores the calibration parameters to the memory 132 of the headset 105.

Figure 4:
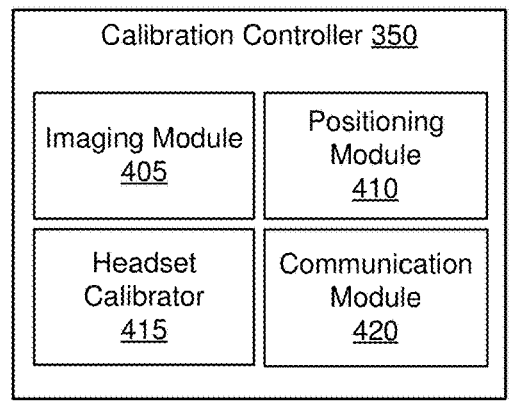
FIG. 4 is a block diagram of a calibration controller, in accordance with an embodiment.

FIG. 4 is a block diagram of the calibration controller 350, according to one embodiment. In one embodiment, the calibration controller 350 includes an imaging module 405, a positioning module 410, a headset calibrator 415, and a communication module 420. Other embodiments of the calibration controller 350 may include additional, fewer, or different modules, and the functions may be performed by different modules.

The imaging module 405 drives actuators to move the support arm 320 and/or the cameras 315 in a predetermined manner. While the headset 105 and/or cameras 315 are moved, the imaging module 405 controls the cameras 315 to capture images of the headset 105. In one embodiment, as described below, the imaging module 405 controls the actuators and the cameras 315 differently for calibrating the positions of the locators 120 and the outputs of the IMU 130.

Figure 5:
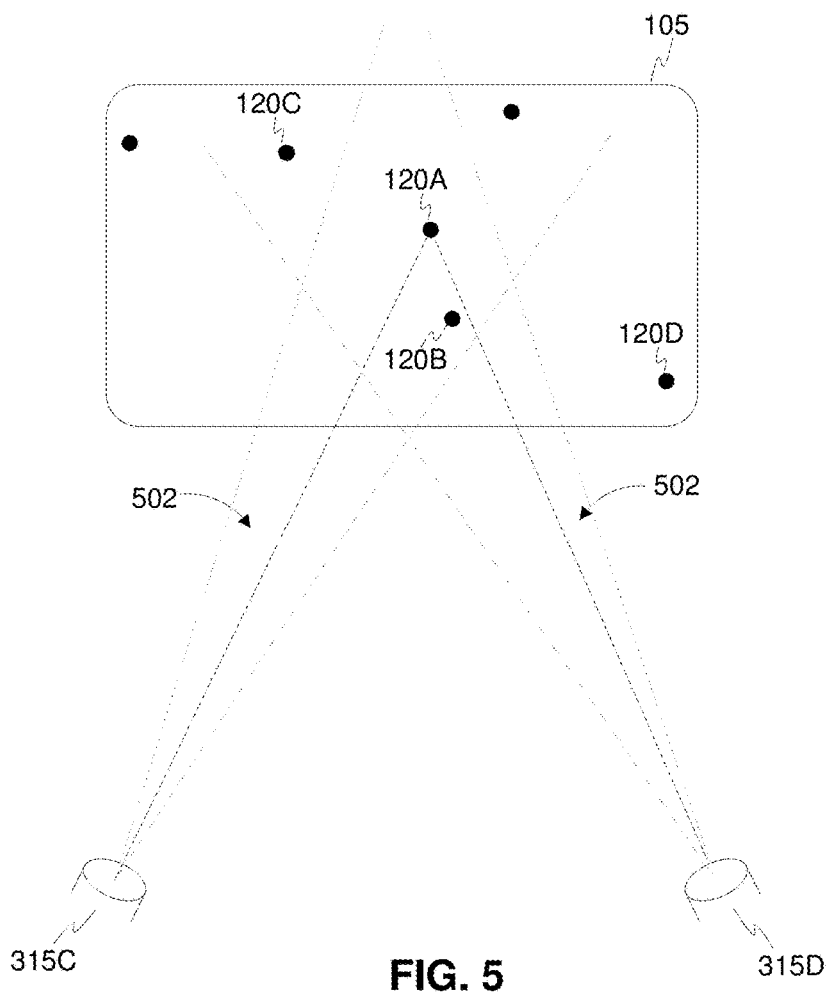
FIG. 5 illustrates an example triangulation of a position of a locator, in accordance with an embodiment.

The positioning module 410 uses the images captured by the imaging module 405 to triangulate positions of the locators 120 in the imaging space 310. FIG. 5 illustrates an example of the triangulation process performed by the positioning module 410. As shown in FIG. 5, two or more of the cameras 315, such as cameras 315C and 315D, capture an image of the headset 105. Generally, the positioning module 410 uses known geometry of the cameras 315 with respect to the headset 105 when an image is captured to determine the positions of the locators 120 in the imaging space 310 and translate the positions in the imaging space to actual positions of the locators 120 on the headset 105. More specifically, the positioning module 410 identifies a position of a locator 120 in the images captured by two or more of the cameras 315. The positioning module 410 also determines the geometry of the cameras 315, including distances of the cameras 315 from the headset 105 and angles between the cameras 315 and the headset 105, at the time the images were captured. The camera geometry for each set of captured images may be predetermined and provided to the positioning module 405, or the positioning module 405 may determine the camera geometry based on time stamps of the images and the predetermined movement of the cameras 315 and/or the support arm 320. Using the camera geometry and the position of a locator 120 in the captured images, the positioning module 405 determines the actual position of the locator 120 on the headset 105.

In one embodiment, the positioning module 410 also uses parameters of the cameras 315 when determining the positions of the locators 120. These parameters include, for example, focal length, focus, offset of an imaging sensor with respect to the center of the lens of each camera 315, or lens distortion parameters. For example, the cameras 315 each have a field of view 502, corresponding to a portion of the headset 105 the camera captures in a given image. Lenses of the cameras 315 distort the captured images, and the distortion is greater near edges of the field of view 502 than near a center of the field of view. That is, the camera distortion introduces an error into the measurement of the actual positions of the locators 120, where the error is greater near the edges of the field of vision 502 than near the center. The positioning module 410 may use the camera distortions when determining the positions of the locators 120 by adjusting the locators' observed positions to compensate for the camera distortion.

As described above, the cameras 315 capture a plurality of images while the headset 105 and/or cameras 315 are moved in a predetermined manner. Accordingly, a given locator 120 may appear in multiple sets of images captured by the cameras 315, where a set of images represents the images simultaneously captured by the plurality of cameras 315. In one embodiment, the positioning module 410 triangulates the position of a locator 120 using any sets of images in which the locator 120 appears in two or more of the images. In another embodiment, the positioning module 410 selects one or more sets of images to use to determine the position of a locator 120. For example, the positioning module 410 selects a set of images to use for positioning a locator 120 in which the locator 120 is positioned closest to centers of the fields of vision of the cameras 315. Alternatively, the positioning module 410 uses a set of images to position any locators 120 falling within the fields of vision of the cameras 315. For example, in FIG. 5, the locators 120A and 120B are positioned in the region of overlapping fields of view 502 of the cameras 315C and 315D, while the locators 120C and 120D are positioned outside the overlapping region. The positioning module 410 therefore uses the images captured in FIG. 5 to triangulate the positions of the locators 120A and 120B, but does not use the images to triangulate the positions of the locators 120C and 120D.

Returning to FIG. 4, the headset calibrator 415 generates calibration parameters for the headset 105. Calibration parameters for a headset 105 describe differences between expected positions and the actual positions of the locators 120 and differences between expected outputs and actual outputs of the IMU 130. For calibrating the positions of the locators 120, the headset calibrator 415 determines distances between the actual positions of the locators 120 (as determined by the positioning module 410) and the expected positions of the locators 120 (as specified by a model of the headset 105). In particular, the headset calibrator 415 applies a non-linear least squares solver to the actual positions of the locators 120 in selected images to determine the deviation of the actual position of the locator 120 from the expected position.

Figure 6A:
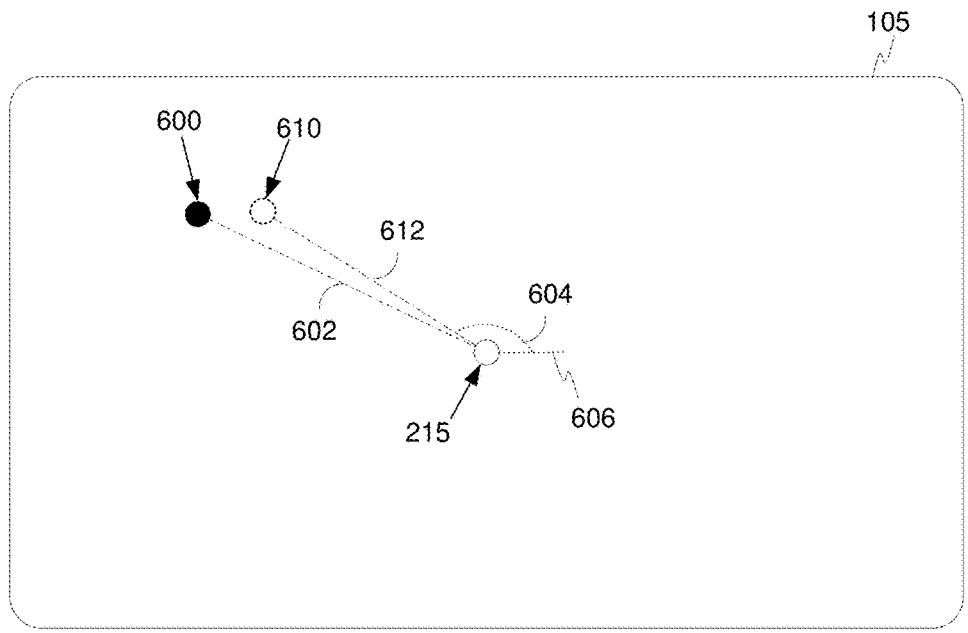
FIGS. 6A-6B illustrate embodiments for specifying distances between actual and expected positions of locators, in accordance with an embodiment.
Figure 6B:
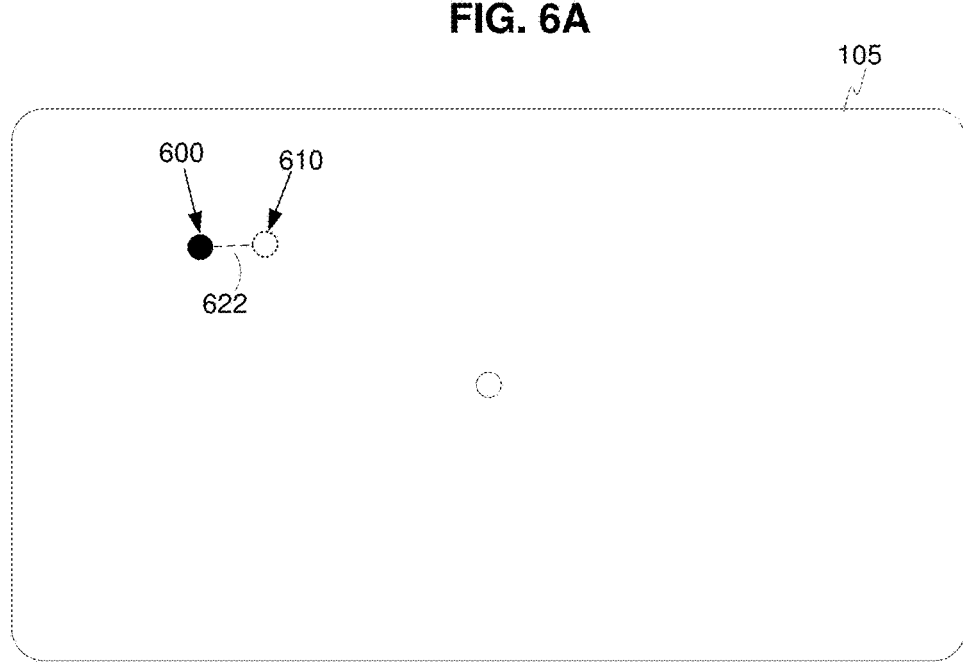

FIGS. 6A-6B illustrate different embodiments for specifying the distance between actual and expected positions of locators 120. In FIG. 6A, the actual position 600 of a locator 120 is specified by a distance 602 from the reference point 215 and an angle 604 from a positive horizontal axis 606 originating at the reference point 215. Similarly, the expected position 610 of the locator is specified by a distance 612 from the reference point 215 and an angle from the positive horizontal axis. In the embodiment of FIG. 6A, the calibration parameters are a vector transformation that, when applied to the distance 612 and angle associated with the expected position 610, outputs the distance 602 and angle 604 associated with the actual position 600. The actual and expected positions of a locator 120 may alternatively be expressed using a rectangular coordinate system or coordinate systems centered at positions on the headset 105 other than the reference point 215. In another embodiment, as shown in FIG. 6B, the calibration parameter for the locator 120 is a vector 622 specifying the actual position 600 of the locator as a distance and angle from the expected position 610. The headset calibrator 415 may alternatively express the actual position of a locator relative to the expected position by any other suitable method.

To calibrate the signals output from the IMU 130, the headset calibrator 415 calculates expected outputs from the IMU 130 and generates calibration parameters that relate the expected outputs to the actual output of the IMU 130. The headset calibrator 415 determines the expected outputs using images of the headset 105 and the calibration parameters for the locators 120. Based on the images, the headset calibrator 415 calculates actual orientations and rates of movement of the headset 105, and determines the IMU signals that would correspond to the calculated orientations and movements. These expected IMU 130 signals are compared to the actual signals output by the IMU 130 to generate the calibration parameters.

The communication module 420 communicates with the VR headset 105 to receive data from the headset 105, such as output signals from the IMU 130, and communicate data to the headset 105, such as the calibration parameters generated for the headset 105. The communication module 420 stores the generated calibration parameters to the memory 132 of the headset for use during operation of the VR system 100.

Calibrating a Virtual Reality Headset

Figure 7:
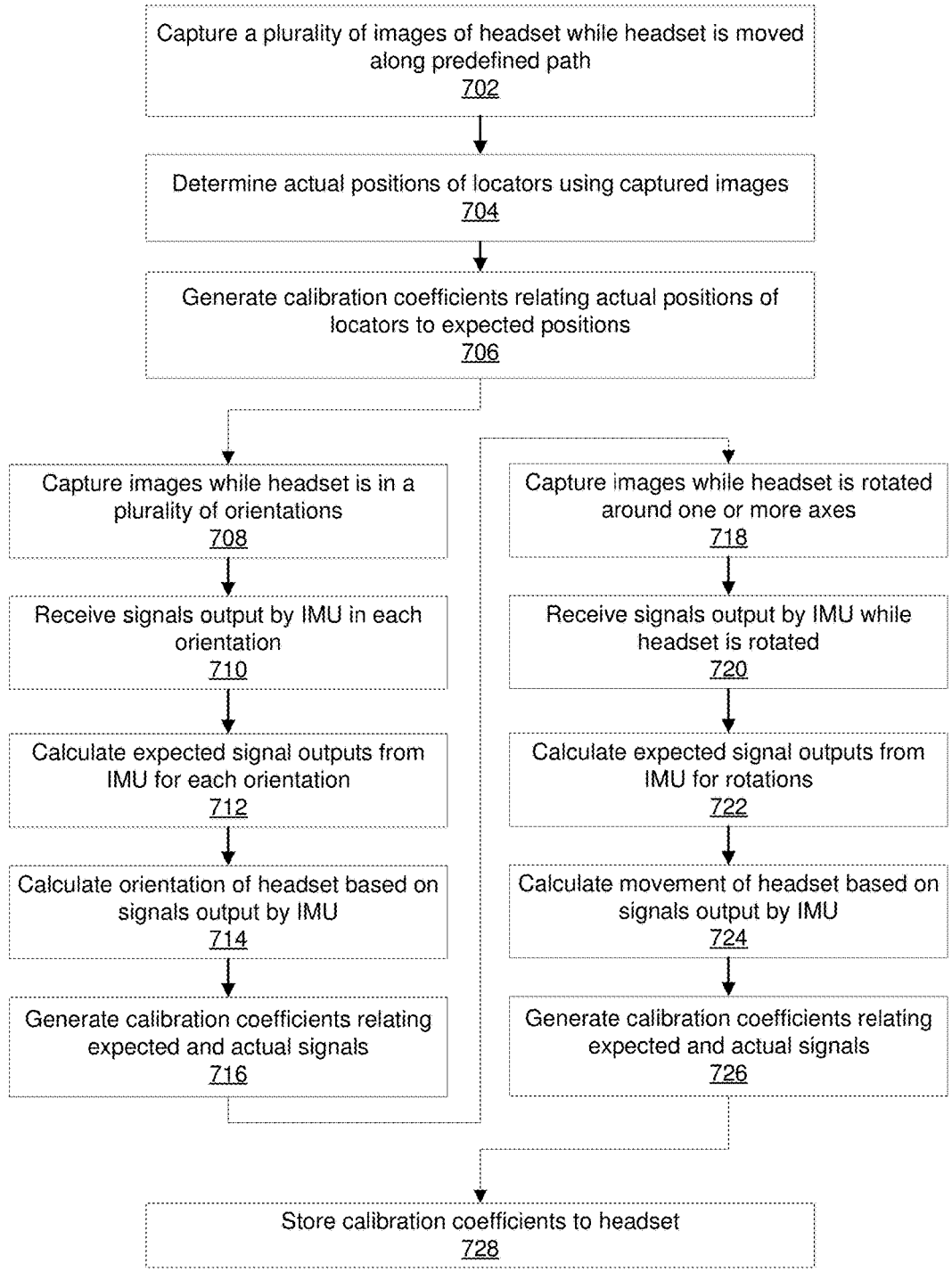
FIG. 7 is a flowchart illustrating a process for calibrating a VR headset, in accordance with an embodiment.

FIG. 7 is a flowchart illustrating a process for calibrating a VR headset 105, according to one embodiment. In one embodiment, the steps of the process are performed by the headset calibration system 300. Other embodiments may include additional, fewer, or different steps, and the steps may be performed in different orders.

To calibrate a headset 105, the headset calibration system 300 captures 702 a plurality of images of the headset 105 while the headset 105 is moved along a predetermined path. The images are captured by a plurality of cameras 315 imaging the predetermined path. In one embodiment, the headset 105 is attached to a support arm 320, and actuators move the support arm 320 and attached headset 105 along the predetermined path. Moving the headset 105 along the path enables the headset calibration system 300 to capture images of all locators 120 of the headset 105, regardless of the position of the locators on the headset. Accordingly, the path may be configured in any shape providing the cameras 315 with direct paths for imaging various sides of the headset 105. In addition to or instead of moving the headset 105, the cameras 315 may be moved in a predetermined manner to image the headset 105. When capturing 702 the images, the headset calibration system 300 may capture images of the headset 105 at regular intervals while the headset is continuously moved, where the relative position of the headset 105 to the cameras 315 in each captured image may be determined using a known rate of movement of the headset 105 and a duration of the intervals. Alternatively, the headset calibration system 300 moves the headset 105 to a predetermined position on the path and pauses the motion while the cameras 315 each capture one or more images of the headset. The headset 105 is then moved to a next specified position and imaged.

Using the captured images, the headset calibration system 300 determines 704 actual positions of locators 120 of the headset 105. The headset calibration system 300 determines positions of one or more locators in each of the images of the headset 105. Based on the positions of the locators in a set of at least two images captured at substantially the same time (that is, while the headset 105 is located at a given position on the path), the headset calibration system 300 determines the positions of the locators 120 in the imaging space 310. In one embodiment, the headset calibration system 300 selects the sets of images to use for positioning each locator 120 based the relative position of each locator 120 with respect to the fields of view of the cameras or based on any other relevant factors. Based on the position of the headset 105 in the imaging space 310 and the determined positions of the locators 120 in the space, the headset calibration system 300 computes the actual positions of the locators on the headset 105.

The headset calibration system 300 generates 706 calibration parameters relating the actual positions of the locators 120 to expected positions of the locators 120. In one embodiment, the calibration parameters for the locators are vector transformations that enable the imaging system 135 to convert the detected positions of each locator 120 in an imaged space to the expected positions of the locators 120 while the headset 105 is in use. Thus, for each of a plurality of the locators 120, the headset calibration system 300 compares the actual position of the locator, detected by imaging and triangulation, to the expected position of the locator, specified by a model of the headset 105. Based on the comparison, the headset calibration system 300 generates a vector transformation that when applied to the actual position of the locator yields the expected position of the locator.

In one embodiment, the headset calibration system 300 performs two calibration processes for the IMU 130: one that is based on static orientations of the headset 105, and one that is based on dynamic movement of the headset 105. For example, the static calibration is used to calibrate signals output by an accelerometer of the IMU 130, while the dynamic calibration is used to calibrate signals output by a gyroscope of the IMU 130. To perform a static calibration of the IMU 130, the headset calibration system 300 positions the headset 105 in a plurality of orientations and captures 708 a plurality of images of the headset 105 while the headset 105 is in each of the orientations. In one embodiment, the headset 105 is moved to a variety of orientations expected to yield IMU 130 signals with a wide range of magnitudes.

Figure 8A:
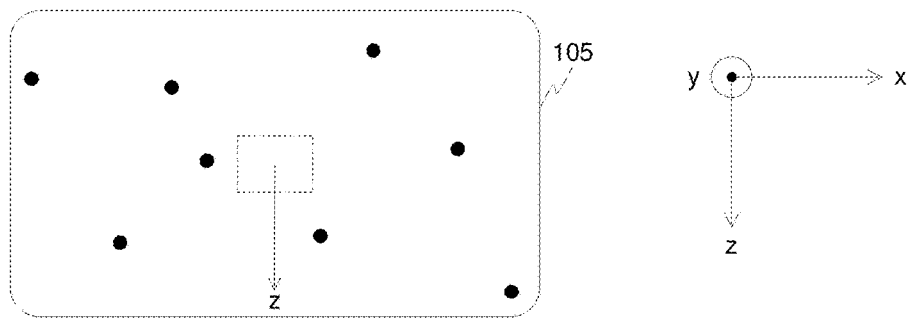
FIGS. 8A-8C illustrate example orientations of a VR headset for calibrating an inertial measurement unit (IMU), in accordance with an embodiment.
Figure 8B:
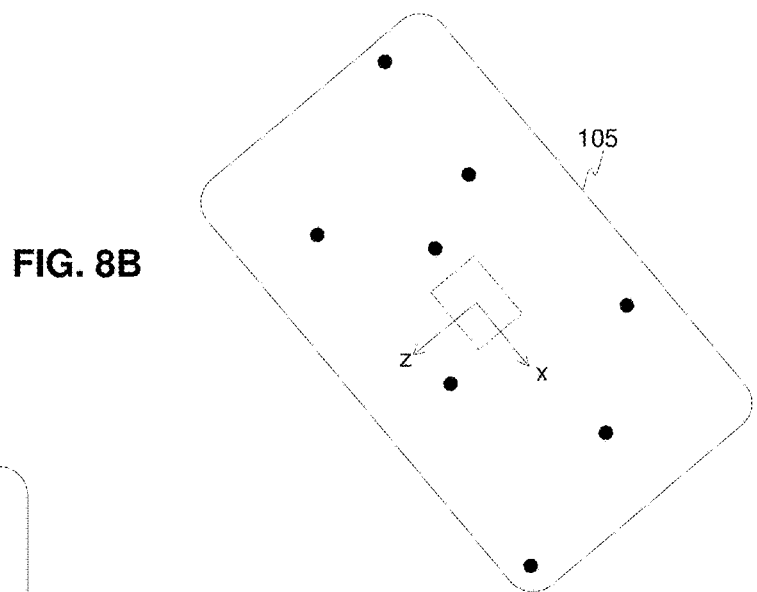
Figure 8C:
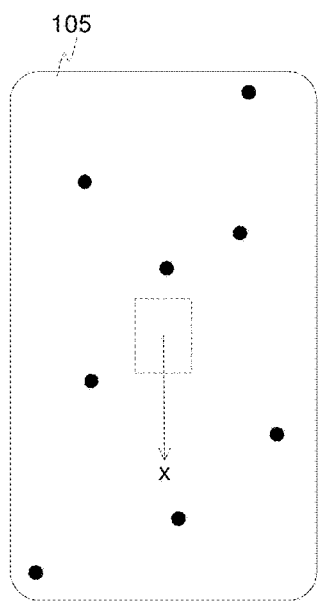

FIGS. 8A-C illustrate three example orientations. In FIG. 8A, the headset 105 is positioned horizontally with respect to gravity (e.g., such that a magnitude of a z-axis accelerometer signal is expected to be large while x- and y-axis accelerometer signals are expected to be zero). In FIG. 8B, the headset 105 has been rotated around the y-axis to an orientation expected to yield approximately equivalent, positive magnitude x- and z-axis accelerometer signals and y-axis accelerometer signal of approximately zero magnitude. In FIG. 8C, the headset 105 has been rotated further around the y-axis to an orientation expected to yield an x-axis signal with a high magnitude and y- and z-axis accelerometer signals approximately equal to zero. The headset 105 may be similarly moved to orientations yielding negative magnitude x-axis and z-axis accelerometer signals and positive and negative magnitude y-axis signals. While the headset 105 is imaged, the headset calibration system 300 receives 710 and stores magnitudes of signals output by the sensors 125 of the IMU 130.

The headset calibration system 300 calculates 712 expected outputs from the IMU 130 for each of the orientations of the headset 105. To identify each orientation, the headset calibration system 300 determines the positions of the locators in the images of the orientation captured by the cameras 315. The headset calibration system 300 matches each locator in the images to a locator in the headset model using the calibration parameters, and then determines the orientation of the headset model that would result in the positions of the locators in the images. Once the orientation of the headset 105 is determined, the headset calibration system 300 determines the expected accelerometer outputs (e.g., an expected magnitude of the signal from each accelerometer channel) for the orientation. Because the positions of the locators 120 for the specific headset 105 are calibrated, the headset calibration system 300 does not need to use the driving of the actuators to determine the orientation of the headset 105 at a given moment.

The headset calibration system 300 also calculates 714 the orientations of the headset 105 based on the actual output signals received from the IMU 130 for each orientation of the headset 105. For example, the headset calibration system 300 determines the orientation of the headset 105 based on the magnitudes of the signal from each accelerometer channel. The headset calibration system 300 uses the magnitudes to determine angles between the accelerometer channels, which in turn correspond to angles between the headset 105 and the axes.

The headset calibration system 300 compares the actual signals output from the IMU 130 to the expected signals by comparing the actual orientations of the headset 105 (calculated using the images of the headset 105) to the expected orientations of the headset 105 (calculated based on the output signals in each orientation). Based on the comparison, the headset calibration system 300 generates 716 calibration parameters relating the actual signal outputs to the expected signal outputs. The calibration parameters for the static IMU 130 signals represent one- or greater-dimensional vector transforms that can be applied to actual signals output by the IMU 130 to yield the expected signals. In one embodiment, the headset calibration system 300 generates a calibration parameter for each accelerometer channel that represents a scaling factor that can be applied to signals from the channel to determine the expected signals from the channel (i.e., a one-dimensional vector transform). In another embodiment, the headset calibration system 300 generates one or more calibration parameters to be applied to multi-dimensional accelerometer signals to determine corresponding expected signals (e.g., a multi-dimensional vector transform). To generate these vector transforms, the headset calibration system 300 may average the differences between the expected and actual IMU signals determined for each of the plurality of orientations (e.g., generated a single calibration parameter for each accelerometer channel). Alternatively, the headset calibration system 300 may generate multiple calibration parameters for the IMU 130, each corresponding to a range of orientations of the headset 105. For example, if the maximum expected magnitude of the x-axis accelerometer signal is X_max (e.g., the magnitude when the x-axis accelerometer is parallel to the direction of gravity), the headset calibration system 300 generates a first calibration parameter to be used when the x-axis signal has magnitudes between zero and X_max/2, and a second calibration parameter to be used for magnitudes greater than X_max/2.

Figure 9:
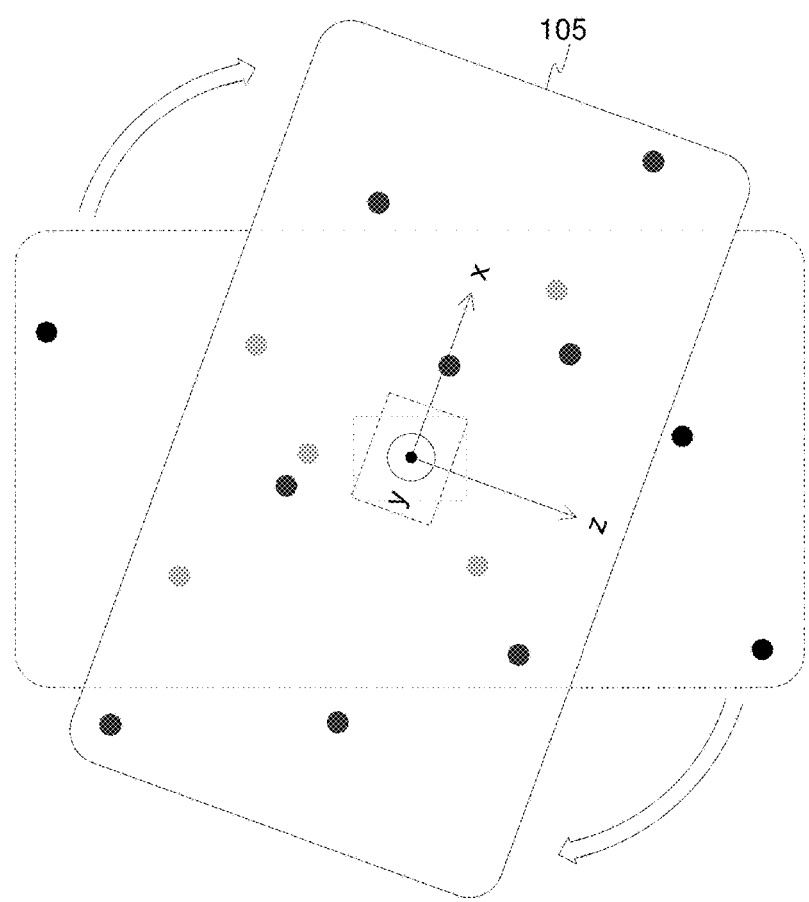
FIG. 9 illustrates an example rotation of a VR headset for calibrating an inertial measurement unit, in accordance with an embodiment.

To perform a dynamic calibration of the IMU 130, the headset calibration system 300 rotates the headset 105 around one or more axes and captures 718 a plurality of images of the headset 105 while the headset is rotated. In one embodiment, the headset 105 is rotated at a fixed rate by the actuators coupled to the support arm. FIG. 9 illustrates an example rotation of the headset 105 around the y-axis (e.g., pitch). The headset 105 may be similarly rotated around the x-axis (e.g., roll) and z-axis (e.g., yaw). While the headset 105 is imaged, the headset calibration system 300 receives 720 and stores signals output by the IMU 130.

The headset calibration system 300 calculates 722 expected outputs from the IMU 130 for the rotations of the headset 105. To calculate the expected outputs, the headset calibration system 300 determines positions of the locators 120 in images captured by the cameras 315 and adjusts the determined positions based on the calibration parameters of the locators 120. Using the adjusted locator positions and the headset model, the headset calibration system 300 determines orientations of the headset 105 in space and a time at which the headset 105 is in each orientation. The headset calibration system 300 then calculates the rate of rotation using the orientation and time data. Expected outputs from the IMU 130 for the calculated rotation rate are then determined. A similar process is used to determine the rate of each rotation of the headset 105 (e.g., clockwise and counter-clockwise rotations around each of the x-, y-, and z-axes). Similarly to the static calibration of the IMU 130, the rate of rotation of the headset 105 is determined based on the imaging of the headset 105 and the calibration parameters for the locators 120. As such, the headset calibration system 300 does not need to rely upon known driving of the actuators to determine the rate of the headset's rotation.

The headset calibration system also calculates 724 the rate of yaw, pitch, or roll of the headset 105 based on the actual output signals received from the IMU 130. For example, the headset calibration system 300 determines the rate of rotation around a given axis based on the magnitude of a corresponding gyroscope signal while the headset 105 is rotated. Alternatively, the headset calibration system 300 determines the rate of rotation using accelerometer signals.

Based on the rate of rotation calculated using the images and the rate of rotation calculated using the actual IMU signals, the headset calibration system 300 determines a difference between the expected IMU 130 signals and the actual signals. For example, the headset calibration system 300 determines a difference between the calculated rotation rates. The headset calibration system 300 then generates 726 one or more dynamic calibration parameters based on the determined difference. In one embodiment, the dynamic calibration parameters include a parameter corresponding to a rotation around each of the three primary axes of the headset 105. Each dynamic calibration parameter represents a transformation that, when applied to a signal output by the IMU 130 while the headset 105 is rotated around the corresponding axis, yields the corresponding expected output signal. An accurate rate of rotation of the headset 105 can then be determined based on the expected output signal.

The headset calibration system 300 stores 728 the calibration parameters for the locators and the static and dynamic IMU calibration parameters to the memory 132 of the headset 105. During operation of the headset 105, the VR console 110 and/or the IMU 130 retrieve the calibration parameters from the memory 132 and use the parameters to accurately track movements of the headset 105. For example, the VR console 110 uses the locator calibration parameters to determine positions of the locators in space based on images captured by the imaging device 135. As another example, one embodiment of the IMU 130 uses the static and dynamic IMU calibration parameters to correct errors in estimates of the position of the headset 105. The VR console 110 may alternatively use the IMU calibration parameters to determine positions and rates of movement of the headset 105.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. A method comprising:
capturing a plurality of images of a virtual reality (VR) headset while the VR headset is rotated around one or more axes;
receiving a signal output by a inertial measurement unit (IMU) while the VR headset is rotated around the one or more axes;
calculating an expected rotation of the VR headset based on the received signal output by the IMU;
determining an actual rotation of the VR headset based on the plurality of captured images;
comparing the actual rotation of the VR headset and the expected rotation of the VR headset;
generating one or more dynamic calibration parameters based on the comparison; and storing the dynamic calibration parameters for the VR headset, the calibration parameters usable to identify rotation of the VR headset during use of the VR headset.

2. The method of claim 1, wherein determining an actual rotation of the VR headset comprises:
determining positions of a plurality of a plurality of locators of the VR headset using at least one of the captured images; and
determining the actual rotation of the VR headset based on the determined positions of the plurality of locators of the VR headset.

3. The method of claim 2, wherein determining an actual rotation of the VR headset based on the plurality of captured images further comprises:
determining a plurality of orientations of the VR headset, each orientation determined based on at least one of the captured images; and
determining the actual rotation of the VR headset based on the determined orientations.

4. The method of claim 2, wherein determining an actual rotation of the VR headset based on the plurality of captured images further comprises:
determining a first position of the plurality of locators on the VR headset based on a first subset of captured images;
determining a second position of the plurality of locators on the VR headset based on a second subset of captured images;
determining a difference between the first position and the second position; and
determining the actual rotation of the VR headset based on the determined difference.

5. The method of claim 1, further comprising:
determining expected accelerometer outputs based on the plurality of captured images; and
determining the calibration parameters based on a difference between the expected accelerometer outputs and the received signal output of the IMU.

6. The method of claim 5, further comprising:
determining angles between accelerometer channels; and
comparing the determined angles and the actual rotation of the VR headset.

7. The method of claim 1, wherein the plurality of images are captured by two or more cameras.

8. A non-transitory computer readable storage medium storing instructions, the instructions, when executed by a processor, cause the processor to:
capture a plurality of images of a virtual reality (VR) headset while the VR headset is rotated around one or more axes;
receive a signal output by a inertial measurement unit (IMU) while the VR headset is rotated around the one or more axes;
calculate an expected rotation of the VR headset based on the received signal output by the IMU;
determine an actual rotation of the VR headset based on the plurality of captured images;
compare the actual rotation of the VR headset and the expected rotation of the VR headset;
generate one or more dynamic calibration parameters based on the comparison; and
store the dynamic calibration parameters for the VR headset, the calibration parameters usable to identify rotation of the VR headset during use of the VR headset.

9. The non-transitory computer readable storage medium of claim 8, wherein the instructions for determining an actual orientation of the VR headset cause the processor to:
determine positions of a plurality of a plurality of locators of the VR headset using at least one of the captured images; and
determine the actual rotation of the VR headset based on the determined positions of the plurality of locators of the VR headset.

10. The non-transitory computer readable storage medium of claim 9, wherein the instructions for determining an actual orientation of the VR headset based on the plurality of captured images further cause the processor to:
determine a plurality of orientations of the VR headset, each orientation determined based on at least one of the captured images; and
determine the actual rotation of the VR headset based on the determined orientations.

11. The non-transitory computer readable storage medium of claim 9, wherein the instructions for determining an actual orientation of the VR headset based on the plurality of captured images further cause the processor to:
determine a first position of the plurality of locators on the VR headset based on a first subset of captured images;
determine a second position of the plurality of locators on the VR headset based on a second subset of captured images;
determine a difference between the first position and the second position; and
determine the actual rotation of the VR headset based on the determined difference.

12. The non-transitory computer readable storage medium of claim 8, wherein the instructions further cause the processor to:
determine expected accelerometer outputs based on the plurality of captured images; and
determine the calibration parameters based on a difference between the expected accelerometer outputs and the received signal output of the IMU.

13. The non-transitory computer readable storage medium of claim 12, wherein the instructions further cause the processor to:
determine angles between accelerometer channels; and
compare the determined angles and the actual rotation of the VR headset.

14. The non-transitory computer readable storage medium of claim 8, wherein the plurality of images are captured by two or more cameras.

15. A system comprising:
two or more cameras; and
a calibration controller configured to:
capture a plurality of images of a virtual reality (VR) headset while the VR headset is rotated around one or more axes;
receive a signal output by a inertial measurement unit (IMU) while the VR headset is rotated around the one or more axes;
calculate an expected rotation of the VR headset based on the received signal output by the IMU;
determine an actual rotation of the VR headset based on the plurality of captured images;
compare the actual rotation of the VR headset and the expected rotation of the VR headset;
generate one or more dynamic calibration parameters based on the comparison; and store the dynamic calibration parameters for the VR headset, the calibration parameters usable to identify rotation of the VR headset during use of the VR headset.

16. The system of claim 15, wherein determining an actual orientation of the VR headset comprises:
    determining positions of a plurality of a plurality of locators of the VR headset using at least one of the captured images; and
    determining the actual rotation of the VR headset based on the determined positions of the plurality of locators of the VR headset.

17. The system of claim 16, wherein determining an actual orientation of the VR headset comprises:
    determining a plurality of orientations of the VR headset, each orientation determined based on at least one of the captured images; and
    determining the actual rotation of the VR headset based on the determined orientations.

18. The system of claim 16, wherein determining an actual rotation of the VR headset based on the plurality of captured images further comprises:
    determining a first position of the plurality of locators on the VR headset based on a first subset of captured images;
    determining a second position of the plurality of locators on the VR headset based on a second subset of captured images;
    determining a difference between the first position and the second position; and
    determining the actual rotation of the VR headset based on the determined difference.

19. The system of claim 15, wherein the calibration controller is further configured to:
    determine expected accelerometer outputs based on the plurality of captured images; and
    determine the calibration parameters based on a difference between the expected accelerometer outputs and the received signal output of the IMU.

20. The system of claim 19, wherein the calibration controller is further configured to:
    determining angles between accelerometer channels; and
    comparing the determined angles and the actual rotation of the VR headset.

* * * * *